F. C. GEPHART.
PROCESS OF CANDY MAKING.
APPLICATION FILED MAY 5, 1921.

1,427,527. Patented Aug. 29, 1922.

INVENTOR
Frank C. Gephart
BY Wm Wallace White
ATTORNEY

UNITED STATES PATENT OFFICE.

FRANK C. GEPHART, OF NEW YORK, N. Y., ASSIGNOR TO HUYLER'S, OF NEW YORK, N. Y., A CORPORATION OF NEW YORK.

PROCESS OF CANDY MAKING.

1,427,527.  Specification of Letters Patent.  Patented Aug. 29, 1922.

Application filed May 5, 1921. Serial No. 467,149.

*To all whom it may concern:*

Be it known that I, FRANK C. GEPHART, a citizen of the United States, residing at New York, N. Y., have invented new and useful Improvements in Processes of Candy Making, of which the following is a specification.

My invention relates to the art of candy-making, and has more particularly to do with the making of candies having soft or fondant centers and coverings therefor of a different and stronger material. The principal object of my invention is to provide a method of overcoming the effect of pressure which may exist in coated candies, due to the difference in the coefficients of expansion and contraction of the centers and the covering material or other causes, by relieving the internal pressure present in candies of this type, which has a tendency to break the cover and cause the center material, if at all soft, to ooze out through the cover; this being known in the trade as a "leak."

It is found that a chocolate coating having a very small quantity of sugar, such as is used in the type of candy having a bitter chocolate coating and frequently known as "bitter sweets," is very weak, so that after the candy has been thoroughly cooled and hardened, when it is packed or again exposed to heat, the cover softens, and due to the internal pressure, the cover breaks, at the weakest part, usually but not always the bottom, and allows part of the center to ooze out, making the candy unsalable.

In the accompanying drawings, in which like reference characters designate corresponding parts in all views, I have illustrated candies showing in a general way their condition at various stages during the carrying out of my process. In these drawings, Fig. 1 shows a candy being pricked with a needle;

Figure 1:
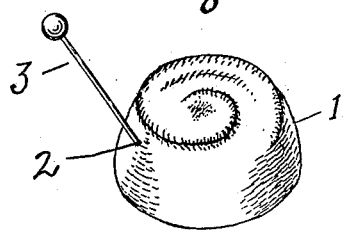
Figure 2:
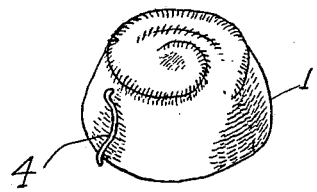
Fig. 2 shows a candy after part of the center material has been allowed to ooze out.
Figure 3:
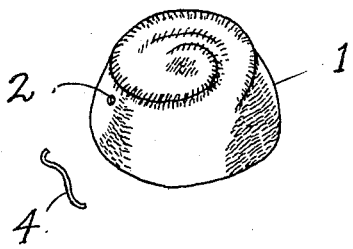
Fig. 3 shows a candy with the "string" knocked off.
Figure 4:
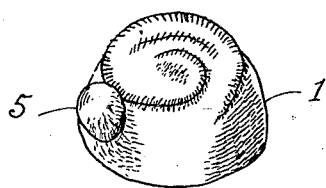
Fig. 4 shows a candy with the opening patched up, the appearance of the patch being exaggerated for illustrative purposes.

According to my process, after the candies 1 are formed in the usual way, an opening 2 is made in the cover, preferably by each one being pricked by a needle or similar object 3, the needle passing through the shell into the center; and these candies are then allowed to stand preferably at room temperature several hours, or perhaps overnight, but in any case long enough to allow a sufficient quantity of the material to ooze out through the opening in the cover to relieve the internal pressure, and reducing the pressure within the cover to approximately atmospheric pressure.

The material which oozes out through the opening in the cover comes out in the form of a string 4 and curls up, the string being perhaps as much as an inch in length, depending, among other things, on the size of the candy and the amount of pressure confined within the cover. After the pressure has been relieved, so that the pressure within the candy is substantially the same as that outside, the string 4 of material which has oozed out and hardened, is flicked with the finger, which knocks it off from the candy and leaves as the only indication of the treatment which the candy has received a plug of the hardened material in the small hole 2 through the cover.

The tray of candies thus treated is passed to an operator provided with a pan of softened covering material, who applies a small quantity of the covering material to the candies, covering up the hardened plug, forming a tight seal 5.

The candies may then be packed and shipped in the usual manner, and without danger of the center material breaking through the cover under all ordinary conditions at which packed candies are kept and handled in the trade.

Having now described my invention, I claim and desire to secure by Letters Patent:

1. The process of making candies having coated centers, which consists in forming the candies, providing an opening in the shell for the escape of a part of the center to relieve the pressure, and thereupon closing said opening.

2. The process of making candies having coated centers, which consists in forming the candy in the usual way, piercing the cover to allow part of the center material to ooze out, flicking off the oozed portion, and covering the pierced portion with coating material.

3. The process of making candies having coated centers which consists in covering the centers with the coating material, allowing them to cool and harden, piercing the coating and allowing part of the center material to ooze out, flicking off the oozed portion, and covering the hole with coating material.

4. The process of making candies having coated centers, which consists in forming the candies and allowing them to cool and harden, piercing the coating, allowing the candy to stand at room temperature until a sufficient quantity of the center material has oozed out to relieve the pressure within the coating, flicking off the oozed portion, and covering the pierced portion with coating material.

In testimony whereof I have signed my name to this specification.

FRANK C. GEPHART.